June 26, 1962　　H. A. DROITCOUR ETAL　　3,040,771
RELIEF VALVE
Filed April 10, 1959　　2 Sheets-Sheet 2
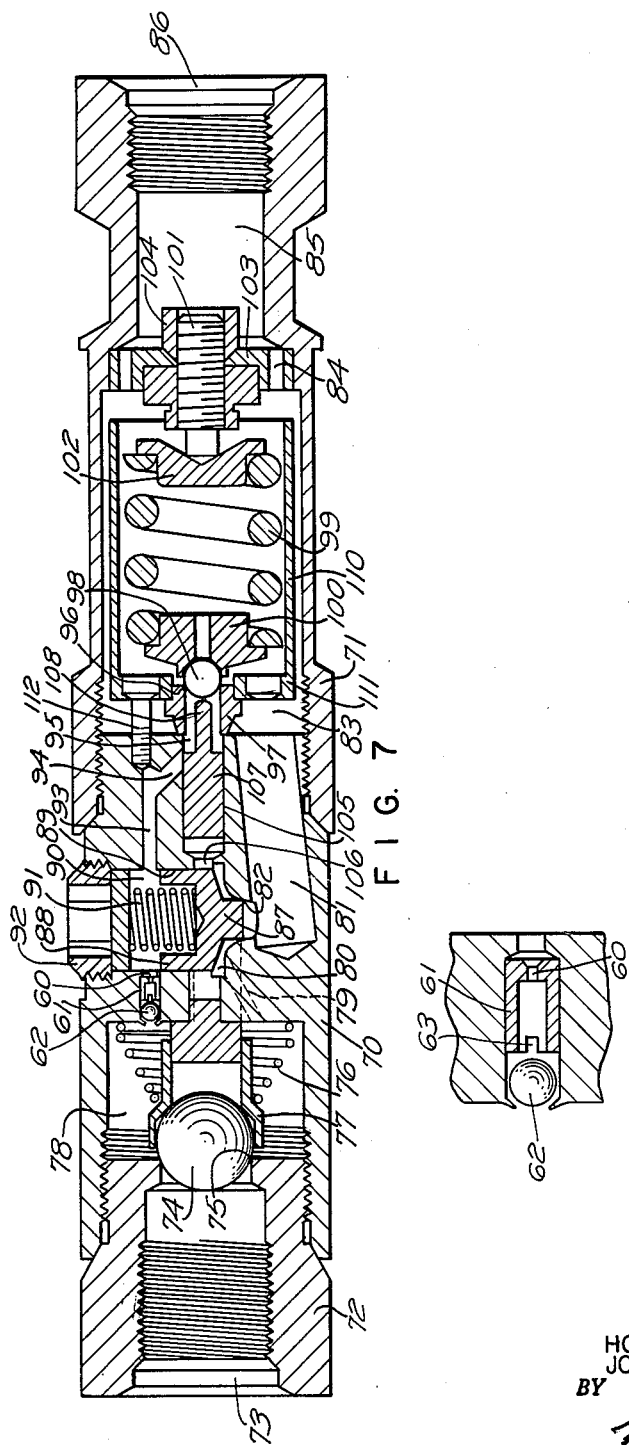
INVENTORS
HOWARD A. DROITCOUR
JOHN M. DROITCOUR
BY
*Barlow & Barlow*
ATTORNEYS

# United States Patent Office 3,040,771
Patented June 26, 1962

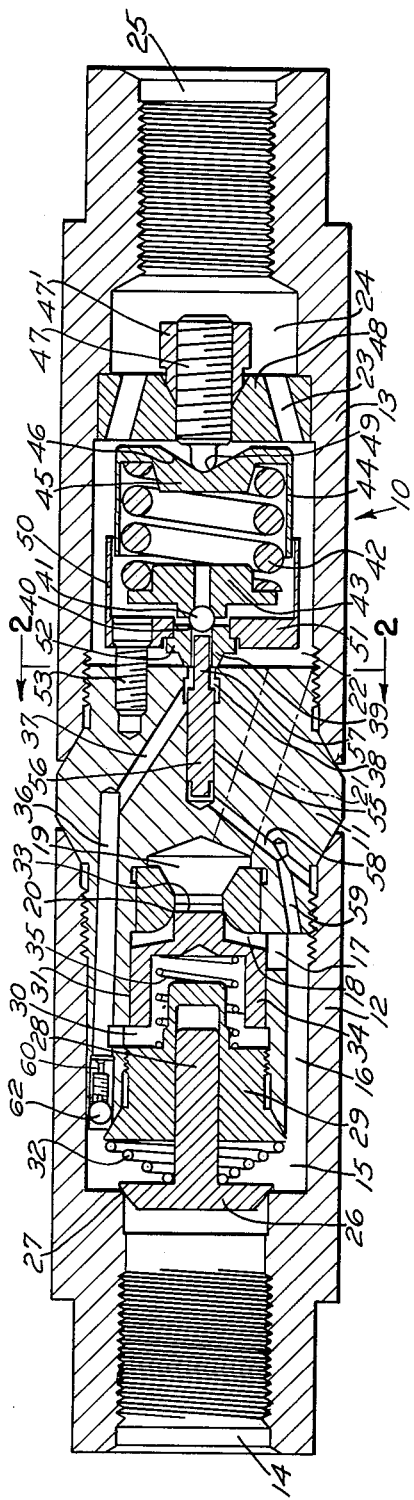

3,040,771
RELIEF VALVE
Howard A. Droitcour, 374 Meshanticut Valley Parkway, Cranston, R.I., and John M. Droitcour, 310 Kirby Ave., Warwick, R.I.
Filed Apr. 10, 1959, Ser. No. 805,405
11 Claims. (Cl. 137—489.3)

This invention relates to a relief valve for use with most any sort of fluid.

One of the objects of this invention is to provide a a relief valve which may be operated equally well at either high or low temperatures.

Another object of this invention is to provide a relief valve in which all of the parts are metal with no soft packings which might be detrimentally affected by heat or cold or age.

Another object of the invention is to provide a relief valve which will operate satisfactorily on liquids of either high or low viscosity.

Another object of the invention is to provide a relief valve which is controlled by a pilot valve with a construction such that there will be little or no chattering of the valve parts as the parts move from open to close position.

Another object of the invention is to provide a valve which may be made with all of its moving parts substantially on the same axis and thus one in which a minimum diameter may be maintained.

With these and other objects in view the invention consists of certain novel features of construction as will be more fully described and particularly pointed out in the appended claims.

In the accompanying drawings:

FIGURE 1 is a sectional view through the valve with the section taken substantially on line 1—1 of FIGURE 2;

FIGURE 2 is a section on substantially line 2—2 of FIGURE 1;

FIGURES 3, 4 and 5 are sectional views on an enlarged scale of the pilot plug and its seat with the plug in different positions relative to its seat;

FIGURE 6 is a detailed view illustrating one of the portions of the valve;

FIGURE 7 is a section view similar to FIGURE 1 showing a slightly modified construction.

In proceeding with this invention, we provide a main plug at the main conduit which controls the majority of the flow of fluid through the valve and in order that the movement of the main plug may be controlled, we have provided a pilot plug which will be controlled by the pressure of the liquid at the inlet opening, the arrangement being such that the pilot valve is held closed by a spring which may be adjusted to regulate the pressure at which the pilot valve will open and thus regulate the pressure at which the main valve will open as the main valve will open in response to the operation of the pilot valve. Chambers are provided with a means for separating the pressure in the chambers from the inlet pressure with an arrangement such that over a period of time there will be sufficient communication between the different chambers on the inlet side of the main valve plug so that all the fluid in these chambers will be in substantial equilibrium. The arrangement is such that should the pressure in the inlet port become greater than a predetermined value, then there will be an upsetting of the equilibrium through a pilot valve so that the main valve may be opened to relieve the pressure at the inlet port, thus permitting flow of the fluid from the inlet port to the outlet port until the pressure relationship has been re-established at the predetermined value.

With reference to the drawings, there is a housing 10 with a number of passages and parts for cooperation to obtain the desired result. The essential parts of the housing may be considered to be a solid section 11 with suitable bores or passages assembled with caps or cylindrical sections 12 at one end and 13 at the other end which cooperate to provide additional passages and chambers in the housing.

In the housing 10 the inlet port 14 is provided which communicates with a through main conduit comprising the chamber 15, passages 16 extending axially of the housing, passages 17 extending laterally of the housing, chamber 18, chamber 19 between which there is a main valve seat 20 and a plurality of passages 21 from the chamber 19 to the chamber 22 thence through passages 23 to chamber 24 and thence to the outlet port 25. A check valve 26 having a seat 27 along the main conduit has a stem 28 guided in the closure 29 of a chamber 30 formed in the part 11 and which communicates with a bore 31. This check valve is pressed to close position by spring 32 and will prevent any flow of fluid from the outlet to the inlet port. A main valve plug 33 fits against seat 20 and has a piston portion 34 which slidably engages the bore 31 of the chamber 30. The sliding fit between this piston 34 and the bore 31 is such that the liquid from the inlet port which passes through opening 17 to area 18 on one side of the piston may gradually pass along the piston to the chamber 30 if the pressure at the inlet port is greater than the pressure in the chamber. A spring 35 acts upon this plug and piston to urge it to close position on its seat 20. This piston thus acts as a separator between the inlet port pressure and the chamber pressure 30 while the plug 33 when in closed position acts as a separator between the chamber 18 or inlet port pressure and the pressure of the outlet port.

Leading from the chamber 30 there is a control conduit 36 extending axially of the housing and a portion 37 extending at an angle inwardly to a chamber 38 which is partly located in the section 11 and partly located in the member 39 which provides a pilot valve seat 40 which is closed by a pilot valve plug 41. This pilot valve plug 41 is spherical and is urged toward its seat by a spring 42 forcing cap 43 against the plug 41 and which is arched so as to receive the plug therein. The spherical shape of the plug enables the spring and cap 43 to rock about the plug so as to adjust itself with relation thereto. The opposite end of the spring is engaged by a cup 44 which embraces a part of the spring and has an end wall 45 which is recessed as at 46 to be engaged by an adjusting screw 47 threaded through the member 48 which is forced into or made rigid with the section 13. Access may be had to this screw 47 through the end of the valve. A nut 47' also threadably engages this screw 47 to act as a check upon it to lock it in adjusting position. The inner end 49 of this screw 47 is spherical to be received in the spherical recess 46 for rocking movement of the parts. The lower end of this spring 42 is also received in a cup 50 which has an end wall 51 cut out to receive and fit upon the flange 52 of the member 39 to provide the chamber 22 beneath it, while this cup is held to the section 11 by screws 53. In this way the spring 42 is enclosed and shielded from the impact of fluid during its passage through the main conduit particularly the portions 21 thereof which discharge into the chamber 22 in which the spring is located. Thus the flow of the fluid will not direct a force on the spring to detrimentally effect the action of the spring 42.

Connected with the chamber 38 there is a bore 55 extending axially of the housing and centrally thereof in which there is located a plunger or separator 56 for axially sliding in this cylindrical bore 55. This separator 56 is of a diameter at its end toward the inlet opening greater than the diameter of the seat for the plug 41 at its point of contact with the seat, and this separator is provided with a projection 57 which extends into close proximity to the plug 41. The sliding fit of the separator 56 and its bore 55 is such that fluid may pass along it if there is a differential of pressure between the chamber 38 and the end of the separator nearest the inlet opening. The end of the bore 55 is connected to the inlet pressure through the conduits 58 and 59, the latter of which it will be noted is connected to the conduit 16. The restricted passage along separator 56 provides for very slow flow of the liquid therealong, and this is particularly true if the liquid is of a viscose nature. Accordingly, in order that the operation may be enhanced where viscose liquid is utilized, we have provided a second communication between the chamber 15 which has direct communication with the inlet opening and the chamber 38 in the pilot valve control line. Such second communication is provided by a restricted opening 60 in member 61 which is inserted between the chamber 15 and the control conduit 36. This restricted opening 60 is provided in a separate part 61 which is inserted within the bore, see FIG. 6, and we provide a filtering device comprising a ball 62 and a seat which is notched as at 63 so that the ball does not quite mate with the seat so as to provide a space between the ball 62 and its seat which will permit of the passage of liquid and solid particles which are less than the size of the restricted opening 60. Thus the restricted opening will not become clogged. This rsetricted opening 60 is of a very short axial dimension. In fact, the axial extent is not greater than ten times the diameter of the opening. Thus the viscose liquid may very easily pass through such a short passage and will not be unduly restricted because of the viscosity of a thick liquid.

The valve seat of the pilot valve is brought out in greater detail in FIGS. 3, 4 and 5. Here the pilot valve plug 41 is illustrated as a sphere and the valve seat 40 is shown as the portion of an arc of a sphere of a different radius and of a larger radius than the radius of the sphere 41. Thus it will be apparent that when the smaller sphere engages the seat, it will contact the point 65 and as the plug 41 moves from its seat the more restricted part of the opening between the plug and the seat will be adjacent the point 65. However, after the plug 41 moves from its seat a certain distance, the opening between the seat and the plug will be narrowest at point 66, as seen in FIG. 5, while at some point in between, the opening between the plug and the seat will be the same at both points 65 and 66 (FIG. 4). Thus, it will be apparent that as the plug 41 opens, the opening through which the liquid may pass is continually varying and thus avoiding getting rhythmic or repeat of vibrations which might be set up or a rhythmic action started as the liquid passes therethrough, thus preventing chattering of the valve.

In operation, assuming the pressures in all of the chambers are substantially the same, should there be a rise in the pressure at the inlet opening, the check valve 26 will open. This pressure will be transmitted to the chamber 15 and conduits 16 and 17 to the upper part of the piston 34 and main plug 33 and also along conduits 59 and 58 to the end of separator 56 which is of a size larger than the seat upon which the pilot plug 41 engages. When the pressure at the inlet port becomes great enough, the force of this pressure on the plug 41 will overbalance the force of the spring 42, and the plug will move from its seat 40. Upon pilot plug 41 being moved from its seat 40, fluid will be quickly exhausted from the chamber 30 through passages 36 and 37, chamber 38 and the space around the projection 57 to area about the spring 42 thence between cups 44, 50 to the chamber 22 and thus to the outlet opening. This will so reduce the pressure in the chamber 30 that the greater pressure in the chamber 18 will force the main plug 33 open and the fluid may escape then through the conduits 16 and 17, chamber 18 and along the passage 19, 21, chamber 22, passage 23 and 24 to the outlet 25. As soon as the pressure is reduced by this passage escape of fluid to a point so that the spring 42 may force the pilot plug 41 back on its seat, the spring 35 will at the same time close the main valve and the chamber 30 will establish equilibrium with the inlet pressure through the restricted passages thereto.

The valve above described has the inlet and outlet in the same line and the main valve also opening axially of the housing. This enables the valve to be made of a minimum diameter. In some cases, however, it may be less expensive where the diameter is not critical to have the main valve open at right angles to the lengthwise axis of the housing, even though the inlet and outlet openings are still in the same in line position. We have illustrated in FIGURE 7 a valve so constructed. Here again the valve has a housing which is formed by a plurality of parts, there being a central part 70 and end sections 71 and 72. The end section 72 provides the inlet port 73, there being a check valve 74 which is urged to its seat 75 by a spring 76 and sleeve 77. A conduit extends from the chamber 78 through conduit 79 to chamber 80 and thence to passage 81 along which there is provided a valve seat 82 thence to chamber 83 and through openings 84, passage 85 to outlet port 86.

The main valve plug 87 seats against seat 82 to close this main flow conduit and is provided with a piston 88 which loosely, slidably fits the bore 89 extending laterally of the section 70. A chamber 90 is formed at the end of this bore 89 and a spring 91 serves to urge the main valve and its piston toward closed position. There is a restricted passage formed along the sliding fit between the piston 88 and its bore 89 so that liquid from the inlet and chamber 80 will pass to the chamber 90 slowly. In order to afford a second restricted passage, we have inserted the same sort of restricted passages designated 60, 61 and 62 as was previously described and which connect chamber 78 with chamber 90.

The chamber 90 is connected by conduits 93 and 94 to chamber 95 which is controlled by a pilot valve comprising a seat 96 in a member 97 which is held against the section 70, and a valve plug 98 which engages this seat and is spherical and of substantially the same construction as described in FIGS. 3, 4 and 5. This plug 98 is forced against the seat by a spring 99 pressing against cap 100 which is arched to receive one end of the spherical plug. This spring 99 is pressed by screw 101 and plate 102 which screw may be adjusted in the block 103 to vary the pressure of the spring 99 and may be held in adjusted position by the nut 104, all of which are accessible through the outlet openings 86.

Extending from the chamber 95, there is a cylindrical bore 105 which communicates through passage 106 with the chamber 80, thus, this bore 105 receives the inlet pressure. A separator 107 is slidably fitted in this bore 105 with a sufficiently loose fit so that a restricted passage is provided between the separator and the bore between chambers 80 and 95. There is a projection 108 from the separator 107 in a position to engage the spherical plug 98 and move it from its seat. A cup 110 provided with an end wall 111 sits on the member 97 and is held to the section 70 by screws 112, thus shielding the spring from the direct action of the flow of fluid along the conduit 81 and into chamber 83. It will be evident that notwithstanding the re-arrangement of the parts of this valve it will operate as above described for the operation of the valve of FIG. 1.

We claim:

1. In a relief valve, a housing having an inlet port and an outlet port at opposite ends of the housing, a main conduit for fluid between said ports having a port adjacent the outlet port extending axially of the housing, a main valve seat along said conduit, a main valve plug engaging said seat to control the flow of fluid along said conduit, walls forming a chamber within said housing, a pressure separator integral with said main valve plug in slidable fit relation with the walls of said chamber and separating the inlet pressure from the chamber pressure except for a restricted fluid passage along said slidable fit and said plug separating the chamber pressure from said outlet pressure, a control conduit independent of the said plug and separator connecting the chamber and the outlet port, a pilot valve seat along said control conduit, a pilot valve plug engaging said pilot valve seat to control the flow of fluid along the control conduit, said pilot plug being urged by chamber pressure to open, a conduit connecting said inlet pressure and the chamber pressure, the walls of which conduit are fixed relative to the pilot valve seat, a movable separator along the last said conduit separating the inlet port pressure from said chamber pressure and having a greater diameter than the diameter of the pilot valve seat at the sealing position, means responsive to the movement of said movable separator to convey to the pilot valve plug the force applied to the movable separator to move the plug to open position, spring means housed in and substantially surrounded by said main conduit adjacent the outlet port and urging said pilot valve plug to closed position with a predetermined force whereby when exceeded by pressure on the pilot valve plug, the pilot plug opens and in turn the main valve plug will be urged to open position by the inlet pressure acting thereon.

2. A relief valve as in claim 1 wherein means are provided to shield the spring from the flow therethrough.

3. A relief valve as in claim 1 wherein a part of the main conduit also surrounds the main valve piston, said main conduit and spring being substantially concentric with relation to the axis of the housing.

4. In a relief valve, a housing having an inlet port and an outlet port, a main conduit for fluid between said ports, a main valve seat along said conduit, a main valve plug engaging said seat to control the flow of fluid along said conduit, walls forming a chamber within said housing, a pressure separator integral with said main valve plug in slidable fit relation with the walls of said chamber and separating the inlet pressure from the chamber pressure except for a restricted fluid passage along said slidable fit and said plug separating the chamber pressure from said outlet pressure, a control conduit connecting the chamber and the outlet port, a pilot valve seat along said control conduit, a pilot valve plug engaging said pilot valve seat to control the flow of fluid along the control conduit, said pilot valve plug being flared on that portion downstream and adjacent to the portion that contacts the seat, and said seat being also flared with a slightly greater flare so as to leave a slight opening between the flared portions when the valve is seated, whereby the location of the most restricted passage of the pilot valve changes as the plug is withdrawn from the seat, said pilot plug being urged by chamber pressure to open, a conduit connecting said inlet pressure and the chamber pressure, a movable separator along the last said conduit separating the inlet port pressure from said chamber pressure and having a greater diameter than the diameter of the pilot valve seat at the sealing position, means responsive to the movement of said movable separator to convey to the pilot valve plug the force applied to the movable separator to move the plug to open position, spring means urging said pilot valve plug to closed position with a predetermined force whereby when exceeded by pressure on the pilot valve plug, the pilot valve plug opens and in turn the main valve plug will be urged to open position by the inlet pressure acting thereon.

5. In a relief valve as in claim 4 wherein the pilot valve plug is spherical on the portion that contacts the seat and said seat is also a portion of a sphere of greater radius than the plug whereby the location of the most restricted part of the opening changes as the plug is withdrawn from the seat.

6. In a relief valve, a housing comprising a body solid section with passages formed therein and cap sections at either end thereof cooperating with said body section to provide additional passages and chambers in said housing, said cap sections having inlet and outlet ports at the opposite ends of the housing, a main conduit in said body and cap sections for passage of fluid between said ports, a main valve seat in said body along said conduit, a main valve plug engaging said seat to control the flow of fluid along said conduit, a chamber in said body section whose pressure bears upon the main valve plug, said chamber having a restricted communication to the inlet pressure, a control conduit in the body section and discharge cap section independent of said main valve and connecting the chamber and outlet port, a pilot valve seat along said control conduit, a pilot valve plug engaging said pilot valve seat to control the flow of fluid along the control conduit, said pilot plug being urged by fluid pressure to open, a movable plunger along the control conduit passageway in a body section transmitting inlet pressure to the pilot plug, the plunger subjected to the inlet port pressure having a greater diameter than the diameter of the pilot valve seat at its sealing position, said main valve and pilot valve having a common axis, spring means urging the main valve along said common axis to closed position, and spring means urging the pilot valve along said common axis to closed position.

7. In a relief valve as in claim 6 wherein the spring means urging said valves to closed position act in opposite directions axially of the valves.

8. In a relief valve as in claim 7 wherein a portion of the main conduit and a portion of the control conduit, the main valve in the main conduit, the pilot valve in the control conduit and the inlet and outlet ports are located on a common axis.

9. In a relief valve as in claim 8 wherein said common axis is also the common axis of the housing.

10. In a relief valve as in claim 8 wherein the pilot valve is downstream of the main valve on the said axis.

11. In a relief valve as in claim 7 wherein a portion of the main conduit, control conduit, the pilot valve and the inlet and outlet ports are on a common axis and a portion of the main conduit and the main valve are on axes perpendicular to the said common axis.

References Cited in the file of this patent

UNITED STATES PATENTS

| | | |
|---|---|---|
| 165,791 | Clemens | July 20, 1875 |
| 487,991 | Callahan | Dec. 13, 1892 |
| 781,913 | Schutte | Feb. 7, 1905 |
| 1,124,113 | Crook | Jan. 5, 1915 |
| 1,305,964 | Dickson | June 3, 1919 |
| 1,804,060 | Morrill | May 5, 1931 |
| 2,059,257 | Letterman | Nov. 3, 1936 |
| 2,470,372 | Roth | May 17, 1949 |
| 2,564,815 | Raymond | Aug. 21, 1951 |
| 2,619,111 | Renick | Nov. 25, 1952 |
| 2,688,977 | Droitcour et al. | Sept. 14, 1954 |
| 2,807,274 | Evans | Sept. 24, 1957 |
| 2,827,075 | Mercier | Mar. 18, 1958 |